United States Patent [19]

Dhawan et al.

[11] Patent Number: 5,418,256
[45] Date of Patent: May 23, 1995

[54] METHOD OF RECLAIMING SCRAP VULCANIZED RUBBER USING SUPERCRITICAL FLUIDS

[75] Inventors: Jagdish C. Dhawan; Richard C. Legendre, both of Mobile, Ala.

[73] Assignee: University of South Alabama, Mobile, Ala.

[21] Appl. No.: 166,356

[22] Filed: Dec. 14, 1993

Related U.S. Application Data

[63] Continuation of Ser. No. 825,265, Jan. 24, 1992, abandoned.

[51] Int. Cl.$^6$ .................... C08J 11/02; C08J 11/04
[52] U.S. Cl. ...................... 521/44.5; 521/41; 521/41.5; 521/44; 521/45.5; 521/48; 585/241
[58] Field of Search ............... 521/41, 41.5, 44, 44.5, 521/45.5, 48; 585/241

[56] References Cited

U.S. PATENT DOCUMENTS

| | | | |
|---|---|---|---|
| 774,727 | 11/1904 | Petersen | 521/44.5 |
| 1,263,567 | 4/1918 | Kruder | 521/44.5 |
| 2,794,057 | 5/1957 | Gunther | 521/44.5 |
| 3,704,108 | 11/1972 | Alpert | 521/44.5 |
| 3,890,141 | 6/1975 | Crane et al. | 521/44.5 |
| 3,896,059 | 7/1975 | Wakefield et al. | 521/42.5 |
| 4,052,344 | 10/1977 | Crane et al. | 521/44.5 |
| 4,384,150 | 5/1983 | Lyakhevich et al. | 521/44.5 |

FOREIGN PATENT DOCUMENTS 1384555 2/1975 United Kingdom ............... 521/44.5

*Primary Examiner*—Paul R. Michl
*Assistant Examiner*—Olga Asinovsky
*Attorney, Agent, or Firm*—Oblon, Spivak, McClelland, Maier & Neustadt

[57] ABSTRACT

The invention pertains to a method of treating vulcanized rubber, such as scrap tires, in which the copolymer is treated with an organic solvent under supercritical conditions, such that an organic solution of several by-products is obtained. These can be conventionally fractionated to recover useful organic compounds.

10 Claims, 5 Drawing Sheets

METHOD OF RECLAIMING SCRAP VULCANIZED RUBBER USING SUPERCRITICAL FLUIDS

This application is a continuation of application Ser. No. 07/825,265, filed on Jan. 24, 1992, now abandoned.

BACKGROUND OF THE INVENTION

1. Field of the Invention

This invention relates to a process for reclaiming vulcanized rubber and to the resultant mixture of organic compounds.

2. Discussion of the Background

In recent years the problem of disposing of discarded tires has become acute. At present over 200,000,000 tires are discarded annually and much research has been directed to addressing this problem.

Scrap tires have been disposed of by open-burning. However, this results in an intolerable level of air pollution. Non-polluting incineration of scrap tires is possible, yet, this method is viewed only as a matter of expediency and is wasteful of a rather valuable raw material. Incineration with waste-heat recovery to generate steam is another method to utilize scrap tires. However, this procedure is not a true recycling technology and again is wasteful of a valuable resource.

Disposal of scrap tires without reclamation of some, if not most, of the material therein must be considered extremely wasteful. Accordingly, efforts have been directed towards recovery of this potential resource.

Few practical methods have been developed for recycling scrap tires. Reclaiming of scrap rubber has been practiced for many years, with digestion and separation of textile materials and some "de-vulcanization" and degradation of the polymer. Recent increases in processing costs have made these operations uneconomical, however, and many plants have discontinued operation. Thus, the need exists for a reclaiming process which would permit inexpensive recycling of scrap tires to recover the organic material therein. Pyrolysis, either in bulk or in solution, has also been explored to degrade and recover the styrene-butadiene copolymer in scrap tires, see Larsen et al, *Rubber Chem. Technol.*, 49, 1120 (1976), Lucchesi et al, *Conservation & Recycling*, 6, 85 (1983), Kawakami et al, ACS Symp. Ser. 130, 557 (1980).

However, compared to the studies on the thermal depolymerization of polystyrene, polybutadienes and their blends, the research on pyrolytic recovery of styrene-butadiene copolymer has not been fully developed. The degradation reaction of styrene-butadiene rubber in tetralin at 140° C. was examined but the resulting material was not otherwise characterized, except to note it as randomly cross-linked material, see Gur et al, *Indian J. Chem.*, 6, 495 (1969).

High-boiling naphthenic oils have also been utilized to dissolve scrap rubber, suggesting that the hot oil serves both physically as a solvent and a heat-transfer medium promoting chain scission, and chemically as a chain-transfer vehicle, see Crane et al, *Rubber Chem. Technol.*, 48, 50 (1975). Although the resulting product was asserted to be a low molecular-weight depolymerized material, no attempts were made to investigate the degradation components.

The use of a supercritical fluid (SCF) as a reaction medium can provide an alternative approach for lowering the operating temperature of pyrolysis reactions. Improved yields and selectivities have been reported in an SCF reaction medium when compared with the results obtained under pyrolysis, see McHugh et al, *Supercritical Fluid Extraction-Principles and Practice;* Butterworth; Stoneham, pp. 195-215 (1986). Supercritical acetone has been used as the reaction medium for the thermal degradation of cellulose, obtaining higher extraction yields at temperatures lower than those used for conventional pyrolysis, see Koll et al, *Angew. Chem. Int. Ed. Engl.*, 17, 754 (1986). Thermal intermolecular organic reactions have been studied in supercritical fluid media at pressures of up to 50.7 MPa and temperatures of up to 500° C. and found that alkanes could be coupled ito alkenes, to 1,3-dienes, and to alkynes, see Metzger et al, *Chemical Engineering at Supercritical Conditions;* Paulaitis et al, Eds.; Ann Arbor Science; Ann Arbor, Mich. (1983); Chapter 26. The oxidation of n-butane in both liquid and SCF phases has also been studied, see, *The Oxidation of Hydrocarbons in the Liquid Phase;* Emanuel, N. M., Ed.; McMillan; New York, 1985.

A unique feature of a supercritical fluid is that it displays a wide spectrum of solvent characteristics. To a first approximation, the solvent power of a supercritical fluid can be related to the solvent density in the critical region. For a reduced temperature ($T_R$) range of 0.9 to 1.2 and at reduced pressures ($P_R$) greater than 1.0, the reduced density ($\rho_R$) of the solvent can vary from a value of approximately 0.1 to 0.9, which possess gas-like densities, and a range of 1.0 to approximately 2.5, which possess liquid-like densities. When operating in the critical region, both pressure and temperature can be used to regulate the density and solvent power of a supercritical fluid.

The extraction of organic material from used tires with supercritical fluids has been reported, see Funazukuri et al, *Journal of Chemical Engineering of Japan*, 18, 455 (1985), however, such an extraction employed supercritical solvents whose densities were in the gas-like range. As such, the extraction is time-consuming and the recovery of organic material is incomplete. The average molecular weight of the resultant organic material ranges from 325 to 480 daltons. Accordingly, this reference fails to recognize the advantages which are obtained from the production of a valuable mixture of organic compounds from the reclamation process. This reference neglects to adjust the parameters of the extraction process so as to obtain a commercially important material. Rather the process of this reference merely converts one form of waste (scrap tires) to a second almost equivalently useless form.

SUMMARY OF THE INVENTION

Accordingly, one object of this invention is to provide a novel method for degrading and extracting vulcanized rubber using supercritical fluids, in which the supercritical fluid has a liquid-like density.

Another object of the present invention is to provide a novel method for degrading and extracting vulcanized rubber, in which the reduced density of the supercritical fluid exceeds 1.0.

Another object of this invention is to provide a novel method for degrading and extracting vulcanized rubber, in which the supercritical fluids are hydrocarbon fluids, such as, benzene, toluene, xylene, tetralin and mixtures thereof.

Another object of this invention is to provide a novel method for degrading and extracting vulcanized rubber, in which the rubber is found in tires, more specifically scrap tires.

Another object of this invention is to provide a mixture of organic compounds resulting from said degradation and extraction method, wherein said mixture of organic compounds can be used as an independent or additive feedstock for a petroleum refinery.

Another object of this invention is to provide a mixture of organic compounds derived from said degradation and extraction method, wherein said mixture of organic compounds can be used as a source of components used in transportation fuels and, more preferably, gasoline.

BRIEF DESCRIPTION OF THE DRAWINGS

A more complete appreciation of the invention and many of the attendant advantages thereof will be readily obtained and the same become better understood by reference to the following detailed description when considered in connection with the accompanying drawings.

DETAILED DESCRIPTION OF THE PREFERRED EMBODIMENTS

Figure 1:
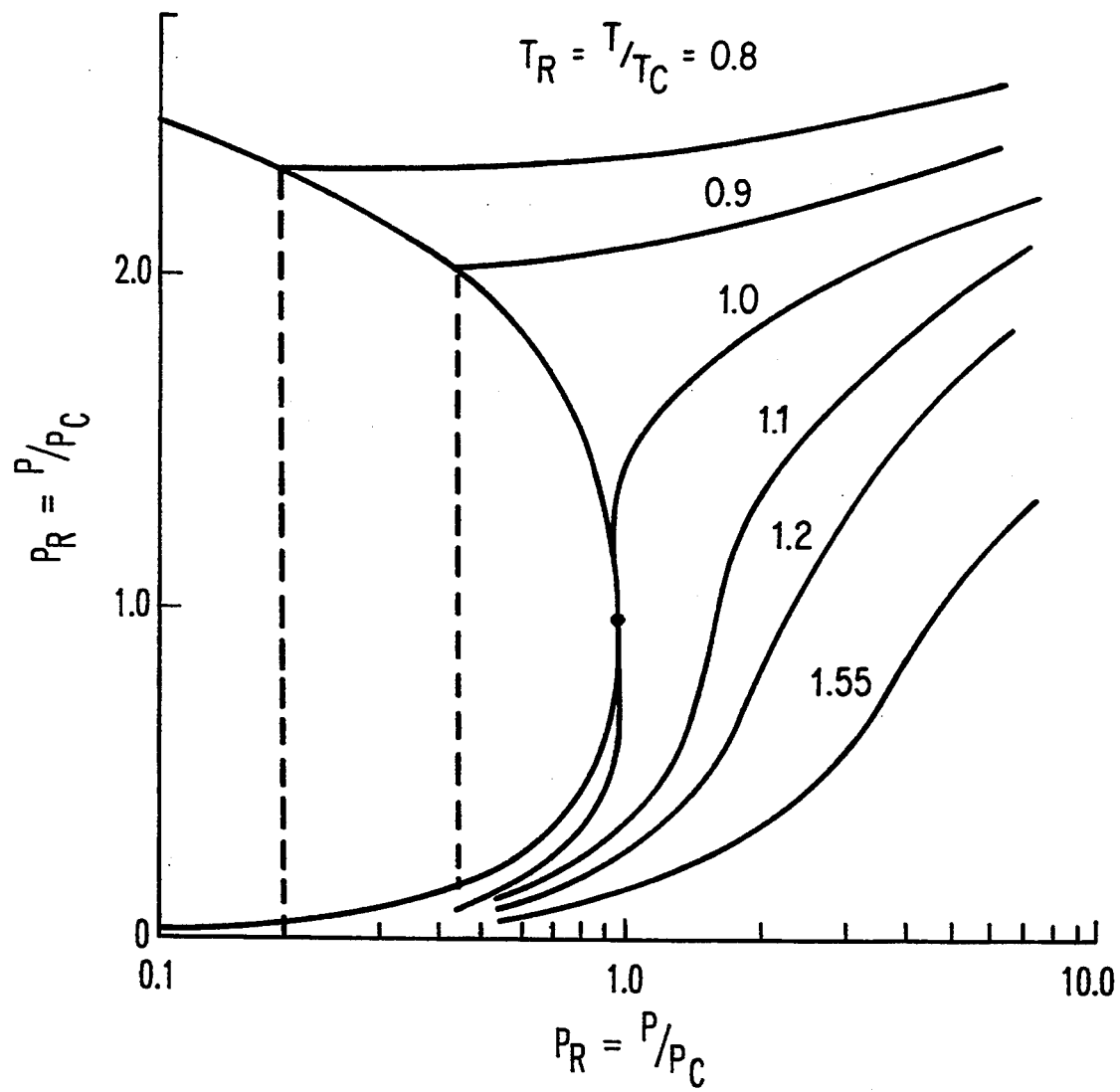
FIG. 1 diagrams the variation of the reduced density ($\rho_R$) of a solvent in the vicinity of its critical point. CP represents the critical point of the solvent, the thermodynamic state in which liquid and gas phases coexist in equilibrium at the highest possible temperature. The values for the reduced pressure ($P_R$), which is the ratio ($P/P_c$) of the measured pressure relative to the critical pressure, are plotted on the ordinate axis. The values for the reduced density ($\rho_R$) are plotted on the abscissa axis; the reduced pressure is the ratio ($\rho/\rho_c$) of the measured density to the density at the critical point. The lines represent isotherms, constant values for the reduced temperature ($T_R$), the ratio ($T/T_c$) of the measured temperature to the temperature at the critical point.

In general, the vulcanized rubber to be treated will be in the form of used or scrap tires. Other forms and sources of vulcanized scrap rubber may be treated, however, and the method is applicable to any vulcanized rubber article for which recycling is desired. The polymeric content of the articles can be natural rubber or synthetic rubber, or blends of the two. By synthetic rubber is meant, chiefly, homopolymers of butadiene, isoprene, chloroprene, or piperylene, or copolymers of these monomers with each other or with such co-monomers as styrene, α-methyl styrene, divinyl benzene, ethylene, propylene, isobutylene, and ethylenically unsaturated-carboxylic acids, esters, nitriles and the like.

The rubber can contain conventional sulfur curing systems, antioxidants, antiozonants, pigments, softeners and other well-known rubber chemicals and compounding ingredients. In any case, the rubber is sufficiently cross-linked, cured, or vulcanized as to be suitable for its original use, so that it will maintain its shape and have a certain degree of resiliency and elasticity. The process of the invention can also be practiced on scrap raw rubber, which has not been vulcanized or cross-linked; but vulcanized or cross-linked rubber scrap is more plentiful and presents a far more difficult recycling problem. Scrap tires which have been rejected because of defects are also compatible with the process of the invention, without the need to age them several years as required in conventional processes. Thus, newly manufactured scrap tires can also be treated, as well.

If desired, the vulcanized rubber can be treated to reduce its particle size before treatment. Although there is no theoretical reason why a whole scrap tire cannot be utilized in the process of the invention, certain practical constraints must be considered. Because of the bulky nature of a scrap tire, the rate of solubilization in the hydrocarbon solvent is generally prohibitively slow, and size-reduction operations are recommended for such bulky structures. Size-reduction can be performed in any convenient manner, and the particle size can be any size which facilitates handling. Commercial machinery is available which is capable of cutting a whole tire into small irregular size fragments, including the beads, which fragments are quite suitable for the process of the invention. If the beads or other steel reinforcing elements are not removed beforehand, they can be screened out of the product or removed by magnetic separation means. A reasonably small particle size piece of scrap rubber vulcanizate is desired from the standpoint of charging the reactor. Considerations of cost size-reduction by mechanical means versus increased solubilization rates for smaller particles will generally dictate what size-reduction measures will be employed, if any.

It is to be understood that the present invention can be practiced either continuously or in batches. Thus, the addition of scrap rubber can be made all at once, in increments, or continuously, until the desired amount is added.

In the present invention, the charge-solvent ratio, which represents the ratio of the weight of the vulcanized rubber to the weight of the solvent, ranges from 1/50 to 1/1.

The hydrocarbon solvent use can be chosen from a variety of materials and combinations thereof. In general, a solvent which contains a substantial portion of aromatic constituents is preferred. The aromatic portion of the solvent can be a low-boiling hydrocarbon, such as benzene, or it can be higher boiling homolog, such as toluene, xylene, naphthalene, anthracene, phenanthrene, etc., or mixtures of two or more of these compounds.

Alternatively, the solvent can comprise the mixture of organic compounds generated during the reclamation process.

One object of fundamental importance is that the scrap rubber reclamation process of the present invention does not merely transform one form of waste to another. Rather, the supercritical extraction and degradation process of the present invention produces a mixture of organic compounds which are commercially important. The organic mixture resulting from the present process has an average molecular weight of less than 200 daltons. This molecular weight range ideally suits the product for use as either an independent or additive feedstock in the petroleum industry. Indeed, an analysis of the components resulting from the present extraction and degradation process shows a strong correlation with the components of transportation fuels and light fuels, particularly gasoline (see Supelco Catolog 29-1991, pages 58-61). The components identified by gas chromotography-mass spectroscopy as resulting from the present process closely correspond to the same materials found in these valuable petroleum products. Accordingly, the present process offers a method for transforming a waste product (scrap rubber) into an economically important raw material.

Other features of the invention will become apparent in the course of the following descriptions of exemplary embodiments which are given for illustration of the invention and are not intended to be limiting thereof.

EXAMPLE I

Automobile tires are largely styrene-butadiene rubber products, particularly styrene-butadiene copolymers. To demonstrate the invention's effectiveness, a polymer was first treated as a test sample. The polymer used was styrene-butadiene ABA Block copolymer (28% styrene content) as supplied by Aldrich Chemical Co. Analytical grade tetralin and toluene were obtained from Fisher Scientific Co., and were 99.9% pure as determined by GC analysis.

The reactor was charged with 20 g of polymer and filled with toluene (~980 mL) at room temperature. For experiments with tetralin, 50 mL of tetralin was added into the reactor replacing an identical volume of toluene. Any air entrapped was released using bleed and vent valves before heating. The reactor was heated to 349° C. (660° F.) and held at this temperature for 1 hour. The heating period was approximately 3.5 to 4 hour and the agitator was operated at about 700 rpm. In all experiments, the pressure was held at 13.8 MPa (2000 psig) by adjusting the bleed valve.

After 1 hour of reaction at 349° C. the reactor was cooled (approximately 40 min) until the pressure decreased to the atmospheric level. The liquid from the reactor was distilled at 90° C. under reduced pressure to isolate the low-boiling components. The distillate and the high-boiling residual liquid were subjected to capillary gas chromatography-mass spectroscopy (GC-MS) analyses. The collected gases were analyzed in separate gas chromatography (GC) runs using a Porapak S packed column (3-mm O.D.×183 cm long). A portion of the high-boiling liquid was vacuum dried at 130° C. for 24 hours for infrared characterization.

GC-MS analyses of the liquid products were carried out on a VG 70-250 SBQ hybrid instrument (VG Analytical, Manchester, UK) equipped with an HP-5890A GC (Hewlett Packard, Palo Alto, Calif.). A 30-meter long, 0.32MM ID capillary coated with 0.5-μm cross-bonded 95% dimethyl-5% diphenyl polysiloxane phase RTx-5 (Restec Corporation, Bellafonte, Pa.) was fitted in the GC. A heated injector (240° C.) and direct GC/MS capillary interface (280° C.) was used. A 1-μL sample was injected in splitless mode, and the splitter valve remained closed for 0.05 min. After the injection, the oven temperature was programmed as follows: 70° C., 1 min isotherm, then increased by a rate of 25° C./min. up to 150° C., followed by an increase of 8° C./min. up to 285° C. which was then maintained for 2 additional minutes. Helium was used as a carrier gas, with 48 kPa pressure in the injector.

Spectra were recorded from the moment of the injection. The MS scan speed was 0.3 s/decade between 600 and 35 amu and the inter-scan delay (fly-back time) was 0.5 s.

The identities of the components eluted across the chromatographic peaks were established by submitting the corresponding mass spectra to a library search. Although the chromatographic separation was not always complete, a comparison of the mass spectra obtained at the leading end and the trailing end of the peaks helped in most cases to assign the molecular ions and the major ions for each of the components. Not all of the components eluted could be definitely identified by the library search. On several occasions, minor or satellite peaks helped to select the best library fit among several similar ones; in other cases, a tentative identification was achieved by a combination of library spectra that closely matched sub-sets of the ion-peaks in the spectrum in question. In some instances, the MS/MS technique was used.

For a toluene-tetralin mixture of 19 to 1 volume ratio, the critical temperature and critical pressure are estimated to be 326° C. (Li method) and 2.9 MPa (Kreglewski and Kay method), respectively, see, Reid, et al, *The Properties of Gases and Liquids*, 4th ed.; McGraw-Hill; New York, 1987; p. 126. Thus, the results of our experiments conducted at 349° C. and 13.7 MPa and listed in Table I correspond to supercritical conditions.

Figure 2:
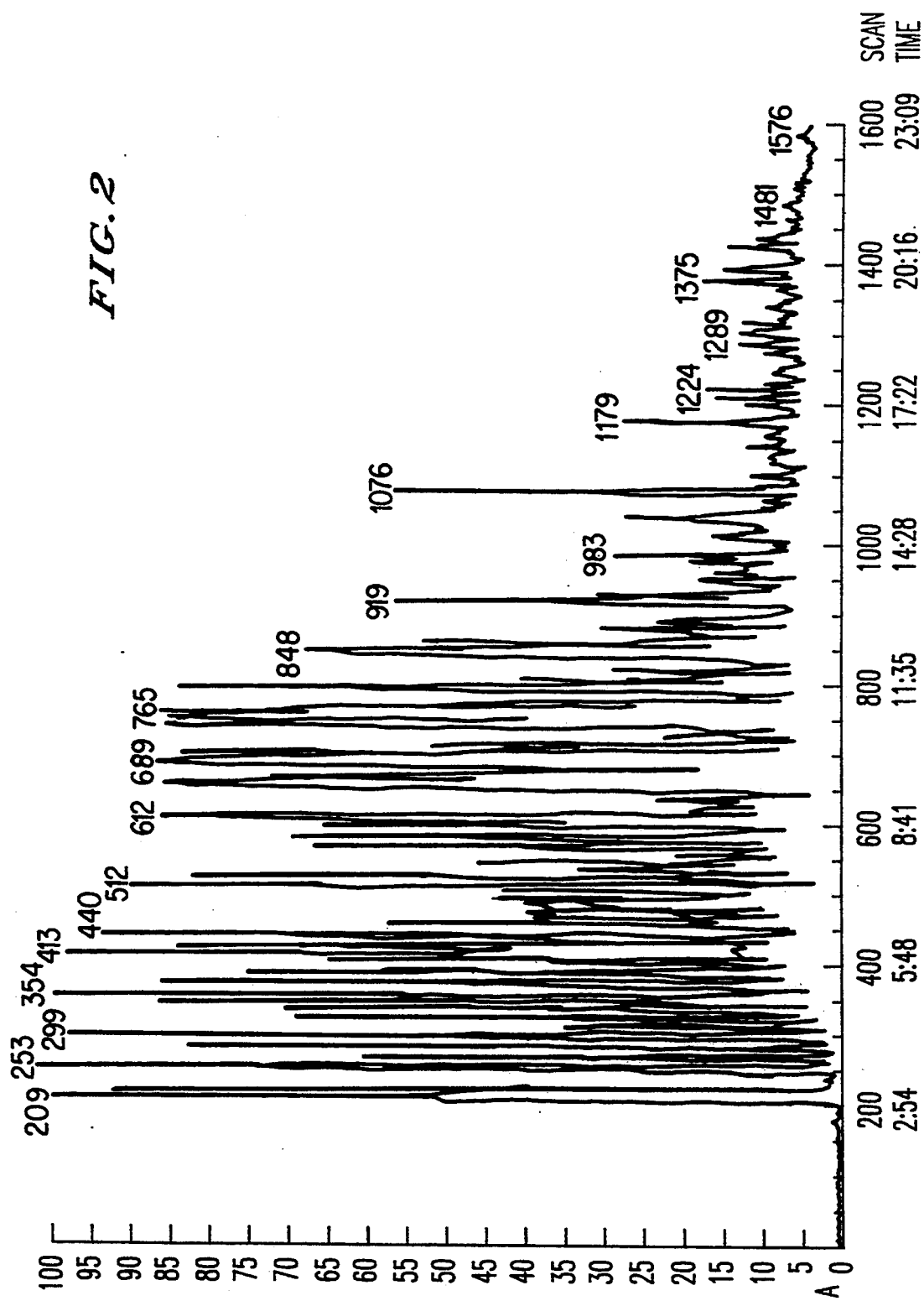
FIG. 2 is the total ion chromatogram of supercritical toluene-tetralin-styrene-butadiene rubber (SBR) reaction products at 349° C. and 2,000 psig.

The GC-MS chromatogram of the reaction products from SBR block copolymer in the presence of supercritical toluene and tetralin is shown in FIG. 2. Over 90% of the components of the organic mixture resulting from the process had molecular weights ≦200 daltons, as determined by mass spectroscopy (Table I). Among these, dimethyl-diphenyls (23 wt. %) are the major products. The other products of significant composition included diphenylethane, methylfluorene, diphenylmethane, diphenylpropane, and methylnaphthalene. In addition, benzene, xylenes, and other alkyl benzenes were also present. In addition, insignificant quantities of hydrocarbon gases such as methane, ethane, ethylene, and acetylene were also present.

TABLE 1

| | GC-Mass Spectral Analysis of Supercritical Toluene-Tetralin-SBR Reaction Products | | | |
|---|---|---|---|---|
| | Compound | M.W. | Scan No. | Composition (%) |
| 1 | o-xylene | 106 | 253 | 1.41 |
| 2 | p-xylene | 106 | 255 | 1.18 |
| 3 | m-xylene | 106 | 257 | 0.48 |
| 4 | ethylbenzene | 106 | 269 | 0.68 |
| 5 | methylethylbenzene | 120 | 284 | 0.91 |
| 6 | propylbenzene | 120 | 299 | 1.99 |
| 7 | 1-ethyl-2-methyl-benzene | 120 | 303 | 1.31 |
| 8 | 2-methylpropyl-benzene | 134 | 327 | 1.01 |
| 9 | 1-ethenyl-2-methyl-benzene | 118 | 338 | 1.04 |
| 10 | butylbenzene | 134 | 354 | 2.14 |
| 11 | 2,3-dihydro-1-methyl-indene | 132 | 374 | 1.33 |
| 12 | 2-methylbutylbenzene | 148 | 389 | 1.18 |
| 13 | 2,3-dihydro-1-methyl-indene | 132 | 405 | 0.96 |
| 14 | 1-methyl-1H-indene | 130 | 413 | 2.14 |
| 15 | methylindene* | 130 | 417 | 0.69 |
| 16 | tetrahydronaphthalene (tetralin) | 132 | 422 | 1.95 |
| 17 | naphthalene | 128 | 440 | 2.59 |
| 18 | 3,4-dihydronaphtha-lene | 146 | 459 | 0.70 |
| 19 | dihydrodimethylindene | 146 | 487 | 0.80 |

TABLE 1-continued

GC-Mass Spectral Analysis of Supercritical Toluene-Tetralin-SBR Reaction Products

| | Compound | M.W. | Scan No. | Composition (%) |
|---|---|---|---|---|
| 20 | methylnaphthalene | 142 | 511 | 4.26 |
| 21 | cyclohexenylbenzene | 158 | 537 | 0.93 |
| 22 | cyclohexylmethylbenzene | 174 | 546 | 0.62 |
| 23 | diphenyl | 154 | 570 | 1.15 |
| 24 | 2-methyl-1,1'-diphenyl | 168 | 583 | 1.28 |
| 25 | ethylnaphthalene | 156 | 586 | 0.71 |
| 26 | diphenylmethane | 168 | 612 | 4.30 |
| 27 | dimethyldiphenyl* | 182 | 659 | 23.19 |
| 28 | diphenylethane | 182 | 689 | 6.92 |
| 29 | 1-methyl-2-phenyl-methylbenzene | 182 | 702 | 1.92 |
| 30 | methyldiphenylethane* | 196 | 713 | 0.70 |
| 31 | ethylmethyldiphenyl | 196 | 773 | 1.41 |
| 32 | diphenylpropane | 196 | 798 | 2.94 |
| 33 | methylfluorene | 180 | 848 | 4.92 |
| 34 | methylvinyldiphenyl | 194 | 862 | 0.94 |
| 35 | phenanthrene | 178 | 919 | 1.06 |
| 36 | diphenylethylene | 180 | 927 | 0.58 |
| 37 | benzyltetrahydronaphthalenone | 236 | 1036 | 0.79 |
| 38 | phenylnaphthalene | 204 | 1076 | 1.50 |
| 39 | phenylethylnaphthol | 250 | 1105 | 0.82 |
| | | | Total | 85.43 |

*Includes isomers

EXAMPLE II

The polymer used was cis-polyisoprene, as supplied by Aldrich Chemical Co. Analytical grade toluene was obtained from Fisher Scientific Co. and was 99.9% pure as determined by the vendor's GC analysis.

The reactor was charged with 24.4 g of polymer and filled with toluene (approximately 980 ml) at room temperature. Details of the experimental procedure were followed as in Example I. For the safe operation of the reactor, polymer and liquid solvent were loaded and then compressed to the desired operating pressure of 2,000 psig at room temperature. Any air entrapped was released using bleed and vent valves before heating. During heating, solvent volume was adjusted by discharging the solvent through the bleed valve, so that the static pressure in the reactor could be maintained at 2,000 psig during the entire operation. The components eluted from the chromatograph were identified by submitting the corresponding mass spectra to a library search.

Figure 3:
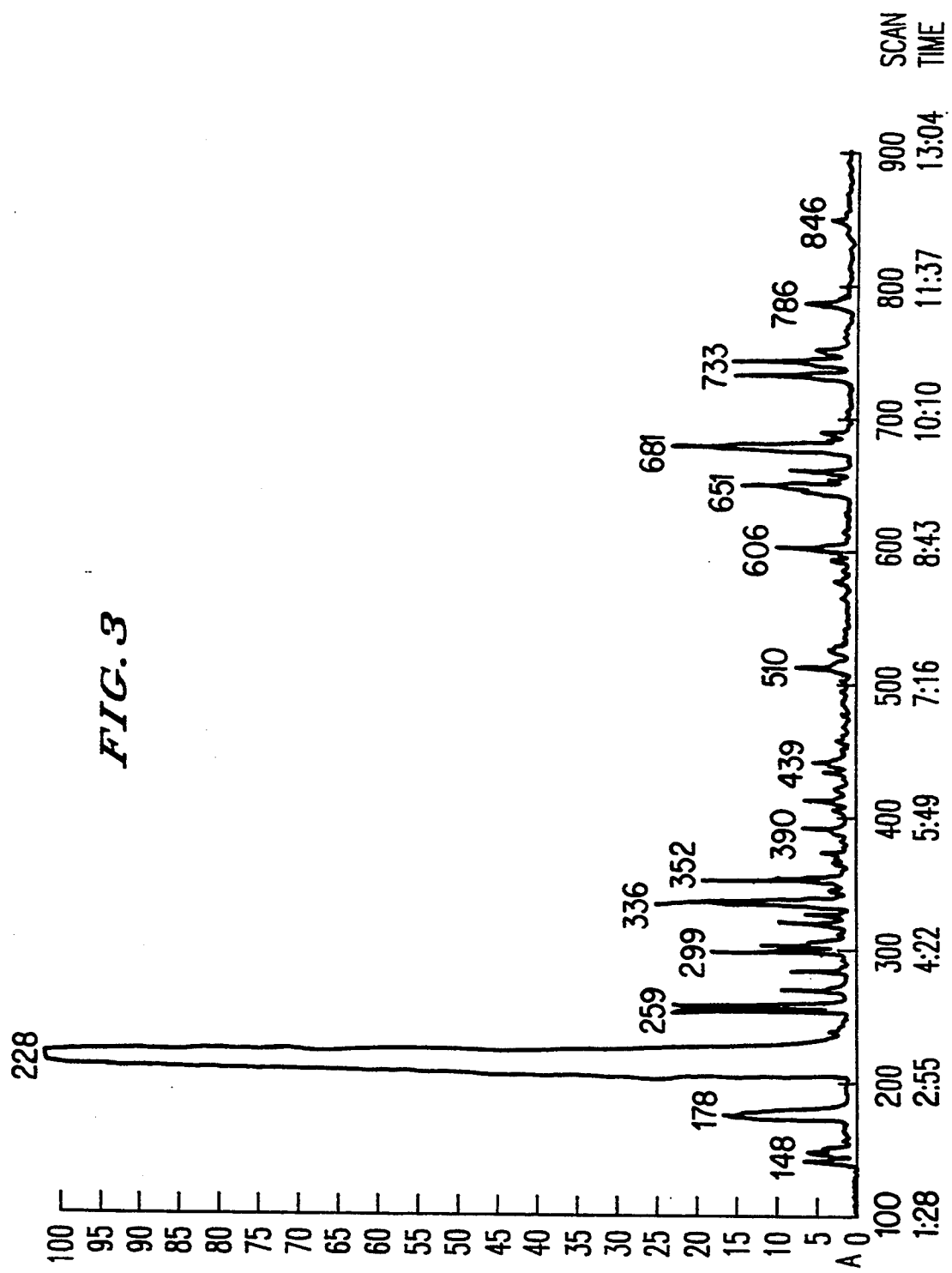
FIG. 3 is the total ion chromatogram of supercritical toluene-cis-polyisoprene reaction products at 349° C. and 2,000 psig.

The GC/MS chromatogram of the reaction products are shown in FIG. 3. 171 peaks were distinguished in a chromatogram and 27 of these were found in abundances greater than 0.5% These major components (some of them include several isomers) are shown in Table 2. The minor compounds, including the unidentified ones, represent around 12% of the mixture and are listed in Table 3. As can be seen, the compounds in Table 2 consist of arylalkyl or diarylalkyl products. Besides a few low molecular weight ($C_3$ to $C_9$) aliphatics, arylalkyl and diarylalkyl are the major compounds. Diphenylmethane, methyldiphenyl and dimethyldiphenyl constitute 36% of the total products. The molecular weight of >90% of the compounds was ≦200 daltons.

EXAMPLE III

Aircraft tire rubber was obtained from a used Good-Year tire (Flight Special II, part no. 156E 6 1-3, TSOC62b; 15×6.00−6). Analytical grade toluene was obtained from Fisher Scientific Co. and was 99.9% pure as determined by the vendor's GC analysis.

The reactor was charged with 36.4 g tire rubber and filled with toluene (approximately 980 ml) at room temperature. Details of the experimental procedure were as presented in Experiment I. The polymer and liquid solvent were loaded and then compressed at a desired operating pressure of 2,000 psig at room temperature. Any air entrapped was released using bleed and vent valves before heating. During heating, solvent volume was adjusted by discharging the solvent through the bleed valve, so that the static pressure in the reactor could be maintained at 2,000 psig during the entire operation. The components eluted from the chromatogram were identified by submitting the corresponding mass spectra to a library search.

Figure 4:
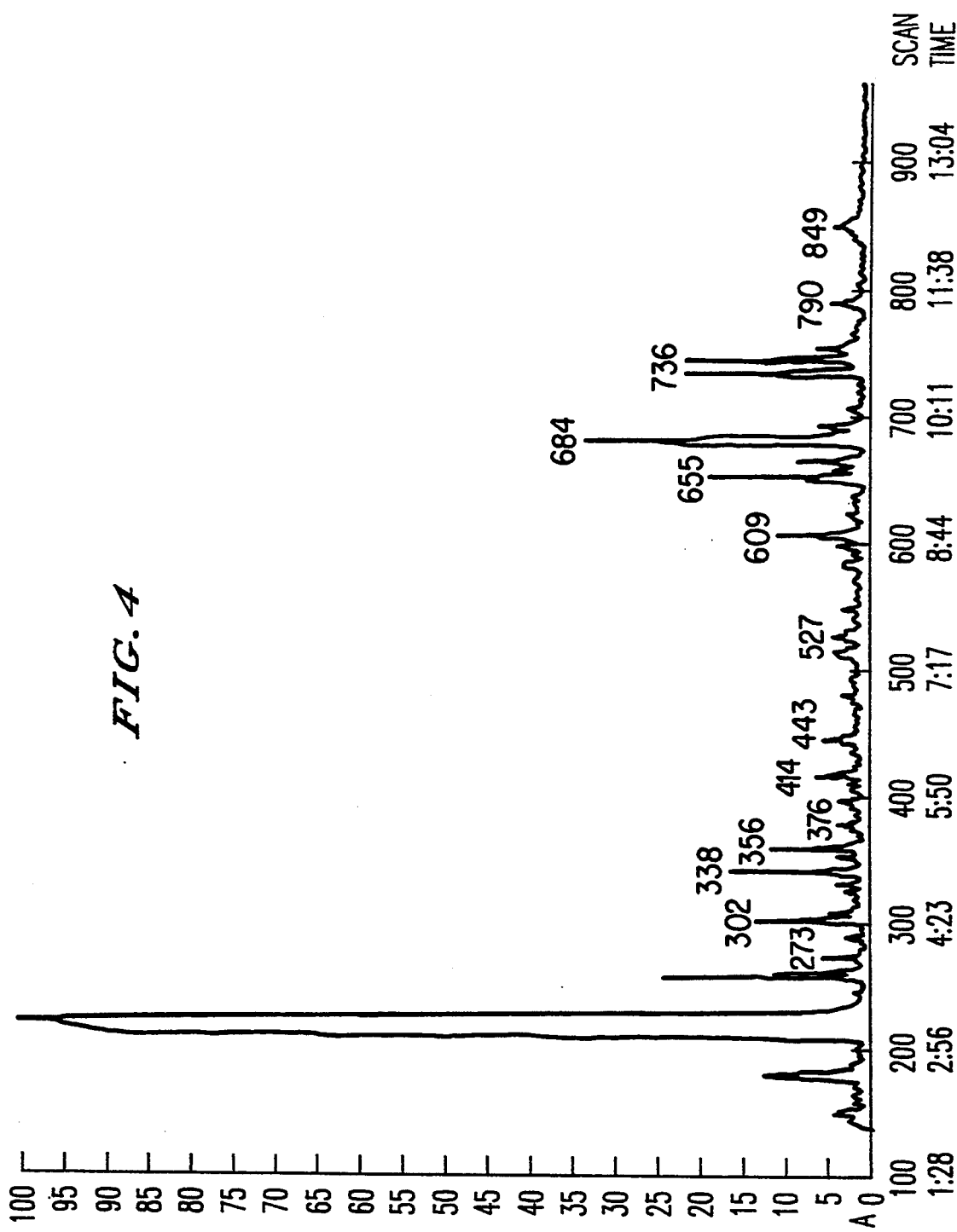
FIG. 4 is the total ion chromatogram of supercritical toluene-aircraft tire rubber reaction products at 349° C. and 2,000 psig.

FIG. 4 shows the GC/MS chromatogram obtained from the experiment. The elution pattern of the products is remarkably similar to that obtained in Experiment II. The products corresponding to the chromatographic peaks were identical in these two chromatograms. It should be noted that the similarities in the results (FIG. 3 and FIG. 4) exist despite the fact that in, the scrap rubber, the polyisoprene is present in a vulcanized (crosslinked) state. The molecular weight of >90% of the components was ≦200 daltons.

EXAMPLE IV

Figure 5:
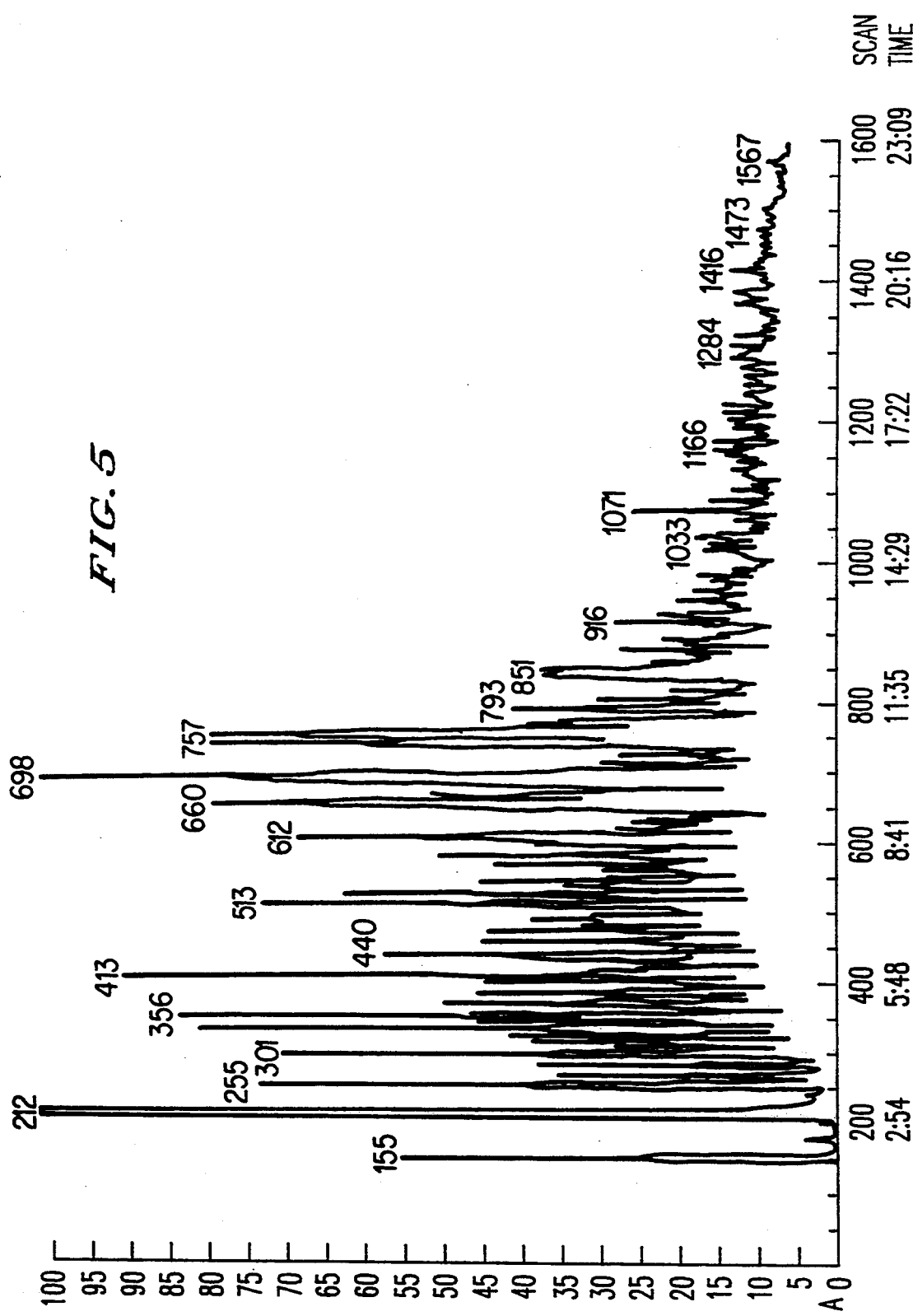
FIG. 5 is the total ion chromatogram of supercritical toluene-automobile tire rubber reaction products at 349° C. and 2,000 psig.
Figure 1:
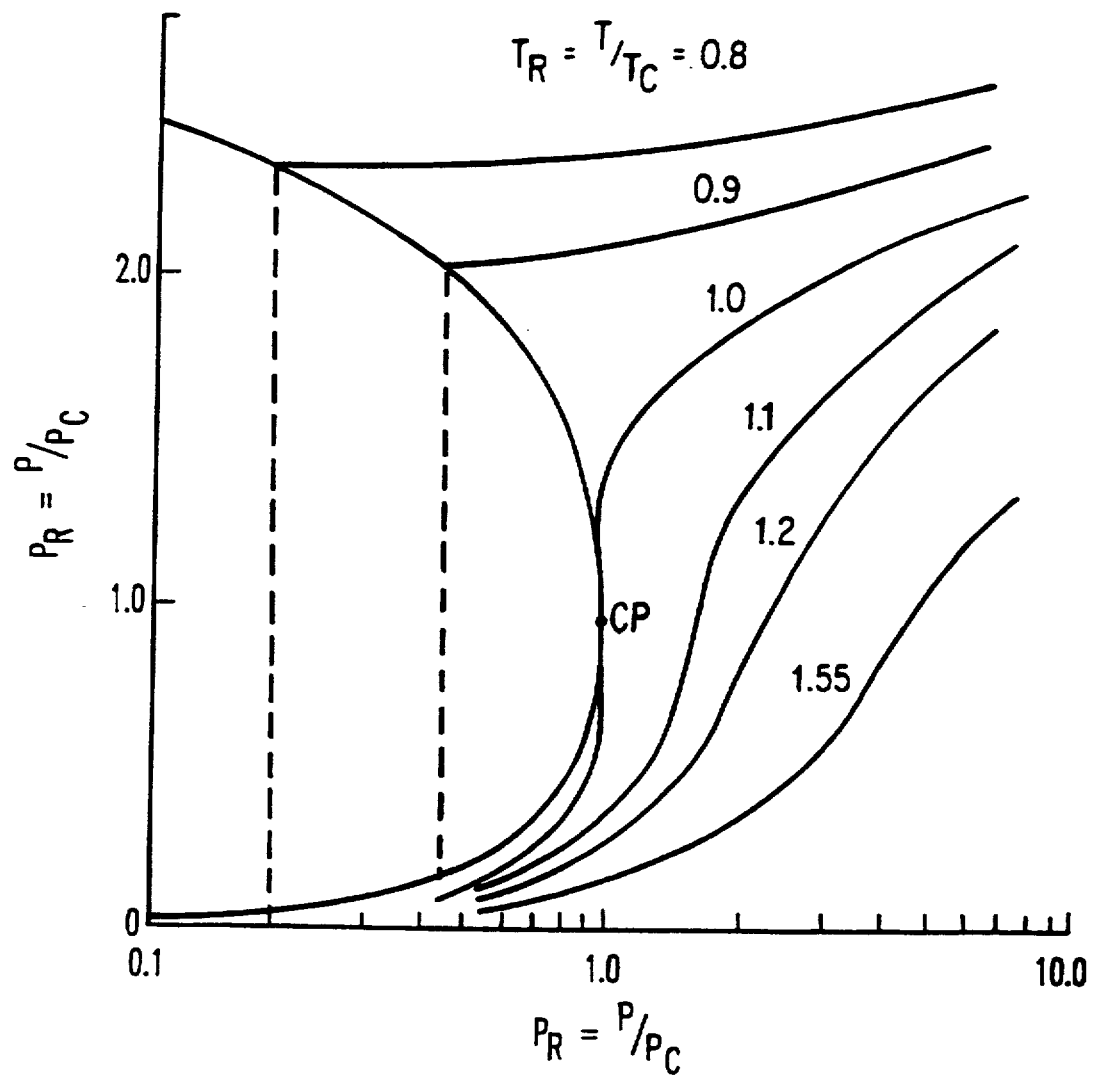

Automobile tire rubber was obtained from a used UniRoyal tire (Tiger Paw, Steel belt, radial). The reactor was charged with 53.9 g tire rubber and filled with only toluene (approximately 960 ml) at room temperature. Tetralin was not used. All other details of the experiment were as presented in Experiment III. FIG. 5 shows the GC/MS chromatogram obtained from the products of this experiment. The elution pattern of the products is remarkably similar to that obtained in Experiment I. All the products identified and listed in Table 1 of Example I are also found in the chromatogram of FIG. 5. It should be noted that the strong similarities in the results (FIG. 2 and FIG. 5) exist despite the fact that in the scrap automobile tire rubber, the styrene-butadiene is present in a vulcanized (crosslinked) state. The molecular weight of >90% of the components was <200 daltons.

TABLE 2

GC-Mass Spectral Analysis of Supercritical Toluene-cisPolyisoprene Reaction Products Above 0.5% Abundances

| | COMPOUND | Scan** | M.W.' | (%) |
|---|---|---|---|---|
| 1 | 2-Methylpropane(#137,#140)* | 140 | 58 | 0.7 |
| 2 | Butane | 146 | 58 | 0.8 |
| 3 | Benzene | 174 | 78 | 7.0 |
| 4 | Xylene(#265,#267)* | 267 | 106 | 5.4 |
| 5 | 1-Ethenyl-3-methylene-cyclopentene | 277 | 106 | 1.5 |
| 6 | Propylbenzene(#289,#303)* | 303 | 120 | 3.3 |
| 7 | Ethylmethylbenzene(#307,#313,#316)* | 316 | 120 | 2.5 |
| 8 | Trimethylbenzene(#309,#323)* | 323 | 120 | 1.7 |
| 9 | 1-Methyl-4-1-methylethylbenzene (#337,#340)* | 340 | 134 | 6.8 |
| 10 | 2-Methylstyrene(#299,#348)* | 348 | 118 | 0.5 |
| 11 | 1,2-Diethylbenzene(#355,#361)* | 361 | 134 | 3.4 |
| 12 | 2-Ethyl-1,4-dimethylbenzene(#367, #371,#391)* | 391 | 134 | 2.6 |
| 13 | 2,3-Dihydro-5-methylindene(#374, #404)* | 404 | 132 | 0.7 |
| 14 | 2,2-Dimethylpropylbenzene(#378, #410)* | 410 | 148 | 1.3 |
| 15 | Naphthalene | 437 | 128 | 1.0 |

TABLE 2-continued

GC-Mass Spectral Analysis of Supercritical Toluene-cisPolyisoprene Reaction Products Above 0.5% Abundances

| | COMPOUND | Scan** | M.W.' | (%) |
|---|---|---|---|---|
| 16 | Dihydrodimethylindene(#424,429, 432,439,482,496)* | 439 | 146 | 2.3 |
| 17 | 3-Methylpentylbenzene(#447, #454)* | 454 | 162 | 0.8 |
| 18 | 2-Methylnaphthalene(#509,#522)* | 522 | 142 | 3.2 |
| 19 | 1-(2-Propenyl)naphthalene | 579 | 168 | 0.8 |
| 20 | Dimethylnaphthalene(#583,#589, #617,#621,#631)* | 631 | 156 | 1.2 |
| 21 | Diphenylethane(#681,#689)* | 689 | 182 | 12.3 |
| 22 | 1-Methyl-2-phenylmethylbenzene | 692 | 182 | 0.9 |
| 23 | 2-Ethyldiphenyl | 694 | 182 | 0.8 |
| 24 | Methyldiphenyl(#648,658)* | 764 | 168 | 5.5 |
| 25 | Diphenylpropane | 789 | 196 | 2.3 |
| 26 | Dimethyldiphenyl(#596,601,654, 665,722,737,748,#754,769,801)* | 801 | 182 | 17.6 |
| 27 | 1-Methylfluorene(#837,#844)* | 844 | 180 | 1.3 |
| | | | Total | 88.2 |

*(Includes isomers at the scan numbers shown)
**(Spectrum number corresponding to the chromatographic peak of the eluting compound)

TABLE 3

GC-Mass Spectral Analysis of Supercritical Toluene-cisPolyisoprene Reaction Products Below 0.5% Abundances

| | COMPOUND | Scan** | M.W. | '(%) |
|---|---|---|---|---|
| 1 | Pentane(#154,#159)* | 159 | 72 | 0.3 |
| 2 | Hexane | 166 | 84 | 0.3 |
| 3 | Methylpentene(#162,#172)* | 172 | 84 | 0.2 |
| 4 | 2,4-Hexadiene | 192 | 82 | 0.1 |
| 5 | 1,2-Dimethylcyclohexene | 252 | 106 | 0.1 |
| 6 | Ethylcyclohexane | 255 | 112 | 0.1 |
| 7 | Propylcyclohexane | 282 | 126 | 0.1 |
| 8 | Methylstyrene | 299 | 118 | ~0 |
| 9 | Butylbenzene | 329 | 134 | 0.1 |
| 10 | 1-Methyl-2-propylbenzene | 351 | 134 | 0.3 |
| 11 | 2-Methylbutylbenzene | 388 | 148 | 0.4 |
| 12 | 1,3-Dimethyl-5-1-methylethylbenzene | 397 | 148 | 0.1 |
| 13 | Diethylmethylbenzene(#383,#402)* | 402 | 148 | 0.5 |
| 14 | 1,2,3,4-Tetrahydronaphthalene | 420 | 132 | 0.4 |
| 15 | 1,2-Diethyl-3,4-dimethylbenzene | 443 | 162 | ~0 |
| 16 | Cyclopentylbenzene | 457 | 146 | 0.2 |
| 17 | 1,3-Dimethyl-2-butenylbenzene | 462 | 160 | 0.1 |
| 18 | Methylphenylpentene | 472 | 162 | 0.3 |
| 19 | 1,2,3,4-Tetrahydro-5-methylnaphthalene | 485 | 146 | 0.3 |
| 20 | 3-Methylcyclopentylbenzene | 491 | 160 | 0.3 |
| 21 | Dihydro-1,1,5-trimethylindene (#465,#480,#500)* | 500 | 160 | 0.4 |
| 22 | 1-2-Butenyl-2,3-dimethylbenzene | 526 | 160 | 0.4 |
| 23 | Tetrahydro-2,7-dimethylnaphthalene(#534,#540)* | 540 | 160 | 0.2 |
| 24 | Cyclohexylmethylbenzene(#537, #543)* | 543 | 174 | 0.4 |
| 25 | 2,4-Dimethylcyclopentylbenzene (#559,#564)* | 564 | 174 | 0.2 |
| 26 | Diphenyl | 567 | 154 | 0.3 |
| 27 | Diphenylmethane | 607 | 168 | 0.3 |
| 28 | 1,2,3,4-tetrahydro-2,5,8-trimethylnaphthalene | 613 | 174 | 0.1 |
| 29 | 1,4,6-Trimethylnaphthalene | 626 | 170 | 0.1 |
| 30 | 1,2-Dihydro-1,1,6-trimethylnaphthalene | 636 | 172 | ~0 |
| 31 | 2,3,6-Trimethylnaphthalene | 705 | 170 | 0.4 |
| 32 | 1-Methyl-7(1-methylethyl)-naphthalene | 717 | 184 | 0.1 |
| 33 | 1,2-Dimethyl-4-(phenylmethyl)-benzene | 827 | 196 | ~0 |
| 34 | 1-Methyldiphenylethane | 856 | 194 | 0.2 |
| 35 | Diphenylbutane (#814,#873)* | 873 | 210 | 0.4 |
| 36 | 1-Methyl-3-(4-methylphenyl)-methylbenzene | 884 | 196 | 0.1 |
| 37 | 2-Ethyldiphenyl | 887 | 182 | 0.1 |
| 38 | Phenylmethylphenylbutane | 891 | 224 | 0.2 |
| 39 | Phenylbutylphenylmethane | 896 | 224 | 0.1 |
| 40 | Phenenthrene | 914 | 178 | 0.4 |
| 41 | 1-Methyl-3-(2-methylphenyl)-methylbenzene | 936 | 194 | 0.1 |
| 42 | 2,3-Dihydro-1-methyl-3-phenylindene | 942 | 208 | 0.1 |
| 43 | 1,1'-(3-Methyl-1-propene-1,3-diyl)bisbenzene | 950 | 208 | ~0 |
| 44 | 2-Phenylnaphthalene | 972 | 204 | 0.1 |
| 45 | 2-Methylphenanthrene(#1036, #1039)* | 1039 | 192 | 0.2 |
| 46 | Dimethylphenanthrene(#1077,1126, 1133,1144)* | 1144 | 206 | 0.1 |
| 47 | 2-Phenylmethylnaphthalene | 1169 | 218 | ~0 |
| | Unidentified compounds | | | 2.6 |
| | | | Total | 11.8 |

*(Includes isomers at the scan numbers shown)
**(Spectrum number corresponding to the chromatographic peak of the eluting compound)

As indicated in the above examples, the process of the present invention produces a mixture of organic compounds, the bulk of which have molecular weights <200 daltons. As such, this material is ideally suited as a feedstock in the production of petroleum products, particularly transportation fuels and gasoline. Thus, the present process of degradation and extraction of scrap rubber using supercritical fluids with a reduced density of greater than 1.0 converts a waste material into a valuable petrochemical raw material. Accordingly, the present process offers a commercially attractive alternative to current methods of scrap rubber treatment.

Obviously, numerous modifications and variations of the present invention are possible in light of the above teachings. It is therefore to be understood that within the scope of the appended claims, the invention may be practiced otherwise than as specifically described herein.

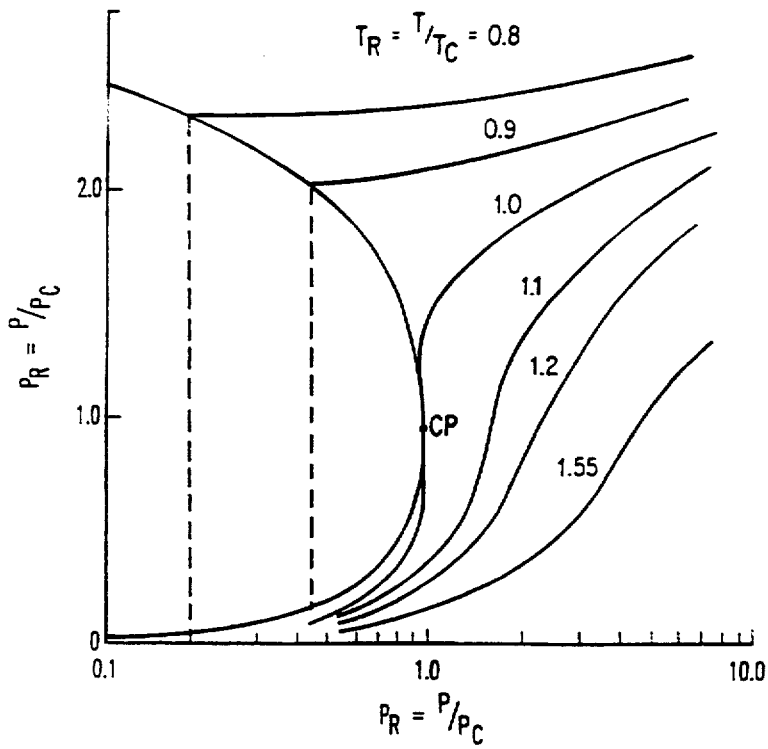

What is claimed as new and desired to be secured by letters patent of the United States is:

1. The process of producing a soluble organic preparation from vulcanized rubber comprising the steps of:
   combining said vulcanized rubber with a hydrocarbon solvent;
   heating the resultant mixture, while holding the pressure constant, until a point, at which the solvent's thermodynamic state in which liquid and gas phases coexist in equilibrium at the highest possible temperature, is exceeded and the solvent becomes a supercritical fluid; and
   maintaining the temperature and pressure of the supercritical fluid, such that the reduced density exceeds 1.0 for a time sufficient to form said preparation.

2. The process of claim 1, wherein said hydrocarbon solvent is selected from the group consisting of toluene, xylene, and toluene-tetralin mixtures.

3. The process of claim 1, wherein said vulcanized rubber is in the form of scrap automobile and truck tires.

4. The process of claim 1, wherein said vulcanized rubber is in the form of scrap aircraft tires.

5. The process of claim 1, wherein said vulcanized rubber comprises styrene-butadiene copolymer.

6. The process of claim 1, wherein said vulcanized rubber comprises polyisoprene.

7. The process of claim 1, wherein said vulcanized rubber comprises blends of styrene-butadiene copolymer, polyisoprene and polybutadiene.

8. A mixture of organic compounds resulting from the process of claim 1.

9. The mixture of claim 6, wherein >90% of components of said mixture have a molecular weight ≦200 daltons.

10. The mixture of claim 7, wherein >90% of components of said mixture have a molecular weight of ≦200 daltons.

* * * * *

UNITED STATES PATENT AND TRADEMARK OFFICE
CERTIFICATE OF CORRECTION

PATENT NO. : 5,418,256          Page 1 of 3
DATED     : May 23, 1995
INVENTOR(S) : Jagdish Dhawan, et al It is certified that error appears in the above-indentified patent and that said Letters Patent is hereby corrected as shown below:

The title page, shown the illustrative figure, should be deleted and substitute therefor the attached title page.

Column 1, line 22, delete "," after "yet".

Column 2, line 14, delete "ito" and insert --to--.

Column 5, line 56, delete "0.32 MM ID" and insert --0.32 mm ID--.

Column 6, line 24, delete "," after "see".

Column 8, line 1, delete "99 9" and insert --99.9--;
    line 23, delete "," after "in" and insert "," after "that".

Column 10, line 18, delete ":" after "the"
    line 21, delete ":" after "ideally".

In the Drawing:
    Figure 1, insert "CP" near the solid dot point. See attached Figure 1.

Signed and Sealed this

Fifth Day of March, 1996

Attest:

BRUCE LEHMAN

Attesting Officer      Commissioner of Patents and Trademarks

United States Patent [19]

Dhawan et al.

[11] Patent Number: 5,418,256
[45] Date of Patent: May 23, 1995

[54] METHOD OF RECLAIMING SCRAP VULCANIZED RUBBER USING SUPERCRITICAL FLUIDS

[75] Inventors: Jagdish C. Dhawan; Richard C. Legendre, both of Mobile, Ala.

[73] Assignee: University of South Alabama, Mobile, Ala.

[21] Appl. No.: 166,356

[22] Filed: Dec. 14, 1993

Related U.S. Application Data

[63] Continuation of Ser. No. 825,265, Jan. 24, 1992, abandoned.

[51] Int. Cl.$^6$ .................... C08J 11/02; C08J 11/04
[52] U.S. Cl. ........................... 521/44.5; 521/41; 521/41.5; 521/44; 521/45.5; 521/48; 585/241
[58] Field of Search ............ 521/41, 41.5, 44, 44.5, 521/45.5, 48; 585/241

[56] References Cited

U.S. PATENT DOCUMENTS

| | | | |
|---|---|---|---|
| 774,727 | 11/1904 | Petersen | 521/44.5 |
| 1,263,567 | 4/1918 | Kruder | 521/44.5 |
| 2,794,057 | 5/1957 | Gunther | 521/44.5 |
| 3,704,108 | 11/1972 | Alpert | 521/44.5 |
| 3,890,141 | 6/1975 | Crane et al. | 521/44.5 |
| 3,896,059 | 7/1975 | Wakefield et al. | 521/42.5 |
| 4,052,344 | 10/1977 | Crane et al. | 521/44.5 |
| 4,384,150 | 5/1983 | Lyakhevich et al. | 521/44.5 |

FOREIGN PATENT DOCUMENTS 1384555  2/1975  United Kingdom .............. 521/44.5

*Primary Examiner*—Paul R. Michl
*Assistant Examiner*—Olga Asinovsky
*Attorney, Agent, or Firm*—Oblon, Spivak, McClelland, Maier & Neustadt

[57] ABSTRACT

The invention pertains to a method of treating vulcanized rubber, such as scrap tires, in which the copolymer is treated with an organic solvent under supercritical conditions, such that an organic solution of several by-products is obtained. These can be conventionally fractionated to recover useful organic compounds.

10 Claims, 5 Drawing Sheets